United States Patent [19]
Eda

[11] 3,964,448
[45] June 22, 1976

[54] ROTARY PISTON TYPE ENGINE

[75] Inventor: Masato Eda, Iwata, Japan

[73] Assignee: Yamaha, Hatsudoki Kabushiki Kaisha, Japan

[22] Filed: Dec. 10, 1974

[21] Appl. No.: 531,351

[30] Foreign Application Priority Data
Dec. 12, 1973 Japan.................... 48-140907[U]

[52] U.S. Cl. .............................................. 123/8.45
[51] Int. Cl.² ........................................... F02G 55/14
[58] Field of Search................. 123/8.45, 8.01, 108; 251/228, 299, 300, 301

[56] References Cited
UNITED STATES PATENTS

| | | | |
|---|---|---|---|
| 3,006,596 | 10/1961 | Nelson................................ | 251/228 |
| 3,244,153 | 4/1966 | Froede................................ | 123/8.45 |
| 3,347,213 | 10/1967 | Froede................................ | 123/8.45 |
| 3,411,487 | 11/1968 | Tado.................................... | 123/8.45 |
| 3,539,150 | 11/1970 | Conrad............................... | 251/228 |
| 3,780,706 | 12/1973 | Panhard............................. | 123/8.01 |
| 3,844,256 | 10/1974 | Ishikawa............................ | 123/8.45 |

*Primary Examiner*—William L. Freeh
*Attorney, Agent, or Firm*—Stevens, Davis, Miller & Mosher

[57] ABSTRACT

A rotary piston type engine having an exhaust port and an intake port which are provided in a rotor housing at circumferentially spaced positions, the intake port being connected with an intake passage which has a valve provided in close proximity with the intake port. The valve is supported at one side for rotation about an axis extending transversely of the intake passage at the side thereof adjacent to the exhaust port between a closed position in which it lies substantially across the intake port and an open position in which it lies along the side of the intake passage. The valve is controlled in accordance with the engine operating condition so that it is closed under a light load operation of the engine.

8 Claims, 2 Drawing Figures

U.S. Patent June 22, 1976 3,964,448
FIG. 1
FIG. 2
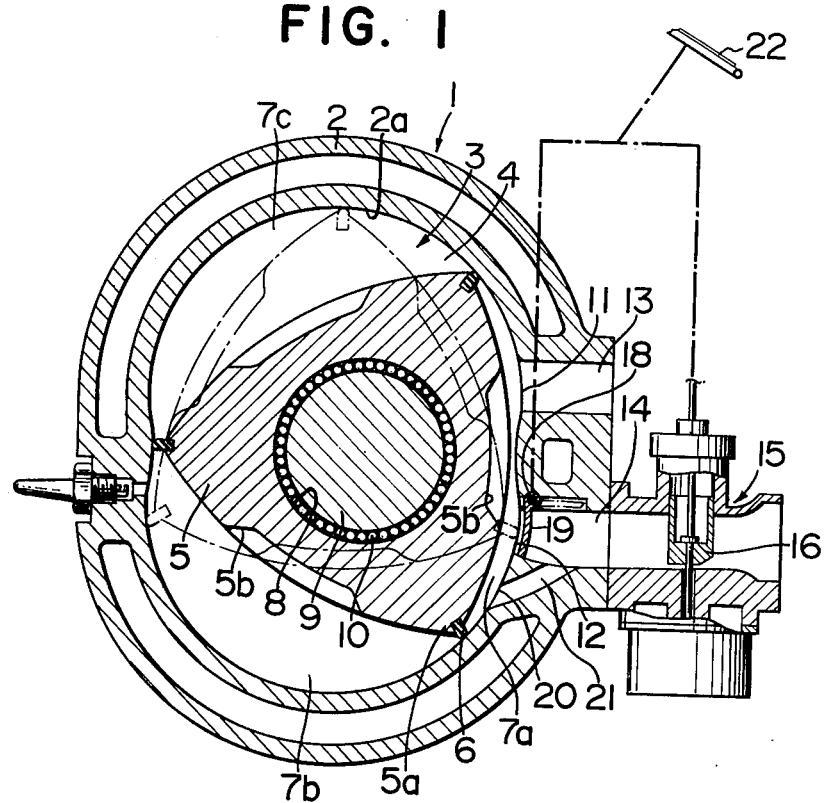
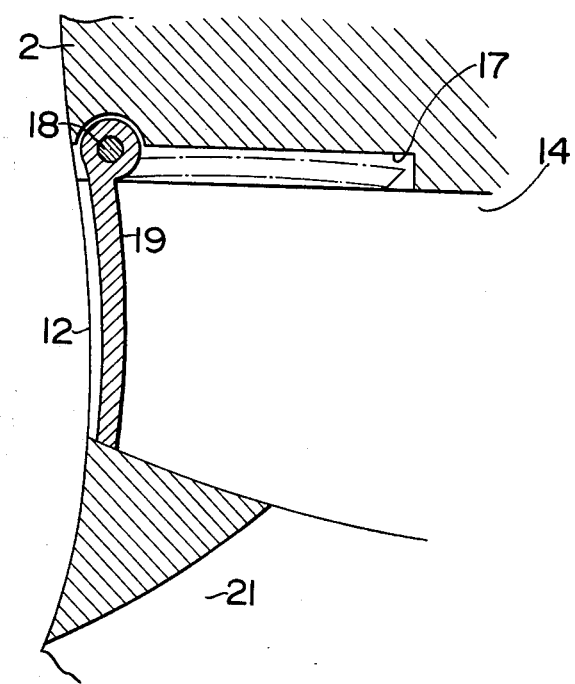

ROTARY PISTON TYPE ENGINE

The present invention relates to rotary piston type internal combustion engines and more particularly to a rotary piston type engine including a casing having a cavity of multi-lobed profile and a multi-lobed rotor disposed for rotation in said cavity. More specifically, the present invention pertains to a rotary piston engine of the aforementioned type having peripheral intake and exhaust port means.

In a rotary piston engine of the type described herein, the casing generally comprises a rotor housing having a multi-lobed cavity and a pair of side housings secured to the opposite sides of the rotor housing, and the rotary piston is disposed in the cavity with its apices in sliding contact with the inner wall surface of the rotor housing whereby working chambers of variable volume are defined in the cavity by the casing and the rotor. Intake and exhaust port means are provided in the rotor housing adjacent each other so that the former opens to a working chamber which is in the intake stroke while the latter opens to another working chamber which is in the exhaust stroke. It is also usual that the multi-lobed piston is provided at peripheral portions between the apices with recesses to define working chambers of appropriate volumes with the rotor housing. During operation of the engine, each of the recessed peripheral portions of the piston cyclically bridges the intake and exhaust ports so that combustion gas in the exhausting working chamber is allowed to flow into the intake port. This overlap condition may be negligible when the rotating speed of the engine is sufficiently high but, under a lower engine speed, the overlap period becomes so large that appreciable amount of exhaust gas is allowed to flow into the intake port to dilute the intake combustible mixture therein causing rough engine operation.

Hithertofore, various attempts have been made to eliminate the above problem. For example, in the U.S. Pat. No. 3,244,153, there has already been proposed to provide a butterfly valve in the intake passage leading to a peripheral intake port. However, in the known arrangement, the butterfly valve must be positioned in the intake passage sufficiently apart from the intake port so as to prevent the valve element from projecting into the intake working chamber in the full open position. Thus, in the closed position of the butterfly valve, a cavity of appreciable volume is defined in the portion of the intake passage between the butterfly valve and the intake port whereby an appreciable amount of combustion gas is introduced into and stored in the cavity during the overlap period. The combustion gas introduced into the cavity during the overlap period is thereafter mixed with the intake combustible gas to dilute the latter.

The U.S. Pat. No. 3,347,213 teaches to provide a rotary valve in the intake passage leading to a peripheral intake port. However, this arrangement is also disadvantageous in that a cavity of appreciable volume is defined between the valve and the intake port when the valve is closed. Further, the rotary valve has a sliding surface of substantial area and is subjected to lubrication problems which are difficult to solve. The U.S. Pat. No. 3,780,706 discloses a valve mechanism which can shut the intake passage leading to a peripheral intake port at a short distance from the intake port. However, the valve mechanism disclosed therein has sliding surfaces which must be carefully lubricated to ensure proper operation thereof.

The present invention has therefore a primary object to eliminate the aforementioned disadvantages of conventional arrangements.

Another object of the present invention is to provide valve means for closing an intake passage leading to a peripheral intake port at a short distance from the intake port.

A further object of the present invention is to provide valve means which is not subjected to lubrication problems.

Yet a further object of the present invention is to provide valve means for closing an intake passage leading to a peripheral intake port, which can be completely retracted from the passage in the open position.

According to the present invention, the above and other objects can be achieved by a rotary piston type engine comprising a casing which includes a rotor housing having a cavity of multi-lobed profile defined by an inner wall thereof and a pair of side housings gas-tightly secured to the opposite sides of the rotor housing; a multi-lobed rotor having a plurality of circumferentially spaced apex portions and disposed in said cavity for rotation with the apex portions in sealing engagement with the inner wall of the rotor housing to define a plurality of working chambers of variable volume in said cavity; intake means including a main intake port provided in said rotor housing and a main intake passage leading to said main intake port; and exhaust means including an exhaust port provided in said rotor housing; the improvement comprising valve means provided in said main intake passage in close proximity to said intake port, said valve means including at least one valve member supported at one side thereof for rotation about a transverse axis closely adjacent to one side of the main intake passage between a closed position in which said valve member extends transversely across the main intake passage from said transverse axis and an open position in which said valve member lies substantially along said side of the main intake passage from said transverse axis toward the direction opposite to the main intake port.

The valve means is controlled in accordance with the engine operating conditions. For example, the valve means may be actuated together with the engine throttle valve so that it is closed when the throttle valve is closed. Alternatively, it may be actuated in accordance with the engine speed in such a manner that it is closed under a low engine speed. In a preferred aspect of the present invention, the main intake passage is provided, at the side where the valve means is supported, with a recess for accommodating the valve member in the open position so that the main intake passage is free from any obstruction.

According to the present invention, the valve means may be so constructed that it allows a certain amount of combustible mixture to flow into the intake working chamber but, in a preferred arrangement, an auxiliary intake port is provided in the rotor housing at the side of the main intake port opposite to the exhaust port.

The above and other objects and features of the present invention will become apparent from the following descriptions of a preferred embodiment thereof taking reference to the accompanying drawings in which:

FIG. 1 is a cross-sectional view of a rotary piston engine embodying the features of the present invention; and FIG. 2 is an enlarged view of the valve mechanism employed in the engine shown in FIG. 1.

Referring to the drawings, the rotary piston engine shown therein includes a casing 1 which comprises a rotor housing 2 having a trochoidal cavity 3 defined by an inner wall 2a. A pair of side housings 4 (only one is shown in FIG. 1) are gas-tightly secured to the opposite sides of the rotor housing 2 as is well known in the art. In the trochoidal cavity 3, there is disposed a substantially triangular rotor 5 which has apex portions 5a provided with apex seals 6. The apex seals 6 are in sealing engagement with the inner wall 2a of the rotor housing 2 so that working chambers 7a, 7b, 7c of variable volume are defined in the cavity 3. As is well known in the art, the rotor 5 has a circular bore 8 coaxial with the center of the triangle and the eccentric portion 9 of an output shaft engages the circular bore 8 through rotor bearing means 10. The rotor 5 is provided at each peripheral portion between two adjacent apex portions with a recess 5b.

The rotor housing 2 is provided with circumferentially spaced exhaust and main intake ports 11 and 12, respectively. The exhaust port 11 communicates with an exhaust passage 13 and the main intake port 12 with a main intake passage 14. The intake passage 14 is provided with a carburetor 15 having a throttle valve 16 disposed in the passage 14. The main intake passage 14 is formed at one side thereof with a recess 17 extending from the main intake port 12 toward the upstream side of the passage. In the recess 17, there is positioned a rotatable valve shaft 18 having a valve member 19 which is secured to the shaft 18 at one side thereof. The valve shaft 18 extends transversely with respect to the main intake passage 14 at a position in close proximity with the intake port 12 and rotation of the valve shaft 18 causes the valve member 19 to move between a closed position in which it extends across the passage 14 in close proximity with the main intake port 12 as shown by solid lines in FIG. 2 and an open position in which it is completely received in the recess 17.

In the illustrated embodiment, the rotor housing 2 is provided with an auxiliary intake port 20 opening into the working chamber at the side of the main intake 12 opposite to the exhaust port 11. The port 20 is connected through an auxiliary intake passage 21 with the main intake passage 14 at the downstream side of the carburetor 15. The valve shaft 18 is connected with a throttle valve actuating mechanism such as an acceleration pedal 22 of an automobile, so that the valve 19 is closed as shown by the solid lines in FIG. 1 when the opening of the throttle valve 16 is small.

In operation, when the engine is running at a normal operating speed, the valve 19 is opened and received in the recess 17. Therefore, combustible fuel-air mixture is introduced mainly through the main intake passage 14 and the main intake port 12 into the working chamber 7a. In FIG. 1, the solid lines show the piston 5 in the overlap period wherein the exhaust port 11 is in communication through the chamber 7a with the intake port 12 so that combustion gas in the vicinity of the exhaust port 11 is allowed to flow into the main intake port 12. However, when the rotor 5 is rotating at a sufficiently high speed, the overlap period is so small that the amount of the combustion gas flowing from the exhaust port 11 into the intake port 12 is negligible and sufficient amount of combustible fresh mixture is supplied through the fully open main intake port 12 to the working chamber so as to provide a high engine output.

During low speed operation of the engine, the overlap period increases to an appreciable extent but, in accordance with the present invention, the intake passage 14 is shut by the valve member 19 so that fresh charge of combustible mixture is introduced into the working chamber only through the auxiliary intake port 20. Thus, it is possible to substantially decrease the overlap period. Further, since the auxiliary intake port 20 is small in relation to the main intake port 12, it is possible to prevent the exhaust gas from flowing into the auxiliary intake port 20.

The valve member 19 extends substantially along the periphery of the cavity 3 in its closed position. Therefore, substantially no room is left in the main intake passage for the exhaust gas to flow thereinto when the valve 19 is closed. A preferable result can be obtained when the valve member 19 has a curved configuration so that it conforms with the curvature of the periphery of the cavity 3. Since the valve shaft 18 is positioned at the side of the main intake passage adjacent to the exhaust passage, an advantage can be obtained in that even when the valve member 19 is inadvertently projected into the working chamber, it is forced by the rotor 5 to return back into the main intake port 12. The illustrated valve mechanism is also advantageous in that the valve member 19 can be completely retracted into the recess 17 and that it has minimum sliding areas.

The invention has thus been shown and described with reference to a preferred embodiment but it should be noted that the invention is in no way limited to the details of the illustrated arrangements but changes and modifications may be made without departing from the scope of the appended claims. For example, although the valve member is shown to completely shut the main intake passage 14, a certain amount of opening may be provided even in the closed position of the valve 19. In this instance, the auxiliary intake port 20 and the auxiliary intake passage 21 may be omitted. Although it is preferable to provide a recess 17 for receiving the valve member 19 in the open position, it may also be omitted. It is further within the scope of the present invention to constitute the valve means by two or more valve elements.

I claim:

1. Rotary piston type engine comprising a casing which includes a rotor housing having a cavity of multi-lobed profile defined by an inner wall thereof and a pair of side housings gas-tightly secured to the opposite sides of the rotor housing; a multi-lobed rotor having a plurality of circumferentially spaced apex portions and disposed in said cavity for rotation with the apex portions in sealing engagement with the inner wall of the rotor housing to define a plurality of working chambers of variable volume in said cavity; intake means including a main intake port provided in said rotor housing and a main intake passage leading to said main intake port; and exhaust means including an exhaust port provided in said rotor housing; the improvement comprising valve means for controlling communication between said cavity and said main intake passage; said valve means including a rotatable valve shaft extending in a transverse direction of said main intake passage, said rotor housing having a recess from said main intake passage on one side of said main intake passage closely adjacent to said exhaust port; and a valve member connected at one end to said valve shaft and movable to open and close said main intake port, said valve shaft being rotatable to move said valve member between a first position in which said main intake port is closed and a second position in which said main intake port is open, said valve member lying completely in said recess in said second position, whereby said main intake passage is free of any obstruction by said valve means when said valve member is in said second position.

2. Rotary piston type engine in accordance with claim 1 in which said valve shaft is located at the one side of the main intake passage closely adjacent to the exhaust port so that the valve member extends from said shaft in the direction of rotor rotation in the first position of said member.

3. Rotary piston type engine in accordance with claim 1 in which the valve member has a curved surface which is facing the cavity in the first position and in conformance with the curvature of the cavity in the rotor housing at the main intake port.

4. Rotary piston type engine according to claim 1 wherein said recess extends at one end from said cavity towards another end which is upstream said main intake passage, said shaft being supported at said one end of said recess.

5. Rotary piston type engine in accordance with claim 1 in which means is further provided for rotating said valve shaft in accordance with engine operating conditions so that said main intake port is closed under a light load operation of the engine.

6. Rotary piston type engine in accordance with claim 2 in which said means for rotating includes means for connecting said valve shaft with a means for actuating an engine throttle valve so that the main intake port is closed when the throttle valve is closed.

7. Rotary piston type engine in accordance with claim 1 in which the valve member is adapted to substantially close said main intake port, and further including auxiliary intake port means at another side of the main intake passage opposite said one side, said auxiliary intake port means having an auxiliary intake port and an auxilariy intake passage for communicating said cavity with the main intake passage.

8. Rotary piston type engine in accordance with claim 7 in which said auxiliary intake port is small in relation to the main intake port.

* * * * *